March 14, 1967      L. W. NELSON      3,309,019
TEMPERATURE CONTROL SYSTEM WITH IMPROVED HEAT ANTICIPATION
Filed Feb. 23, 1965
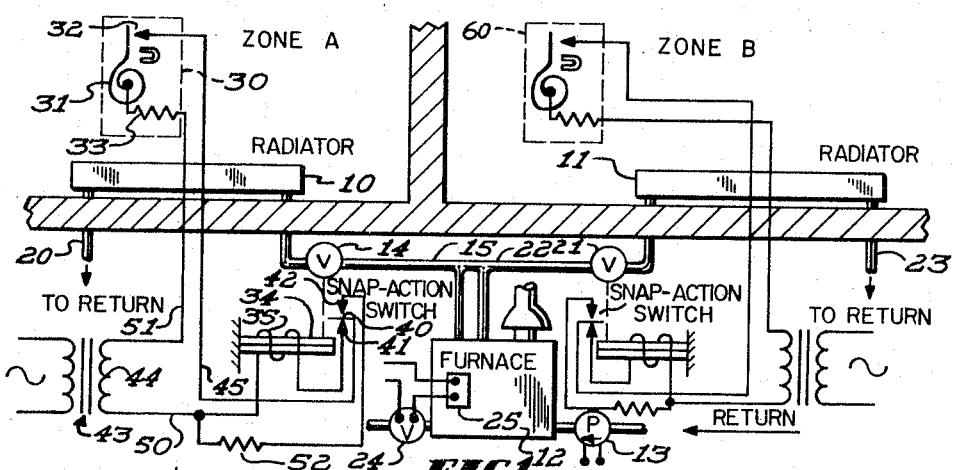
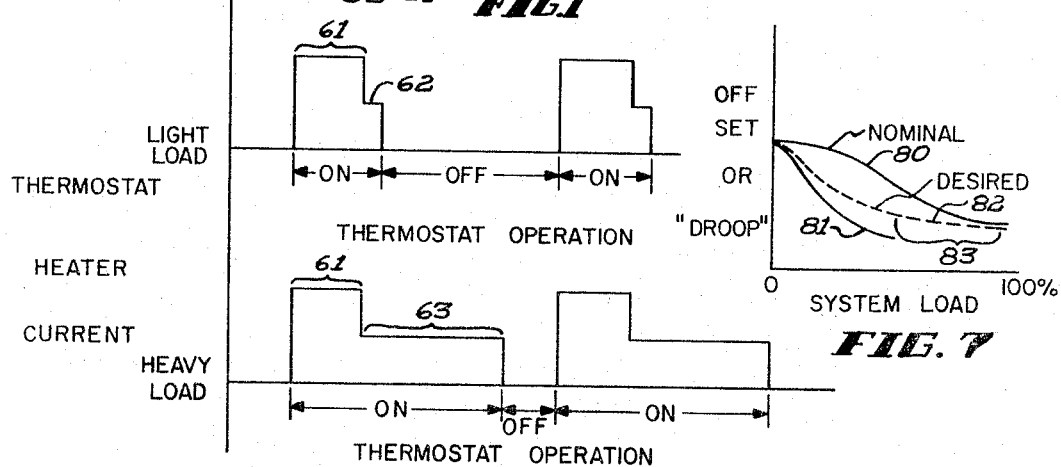
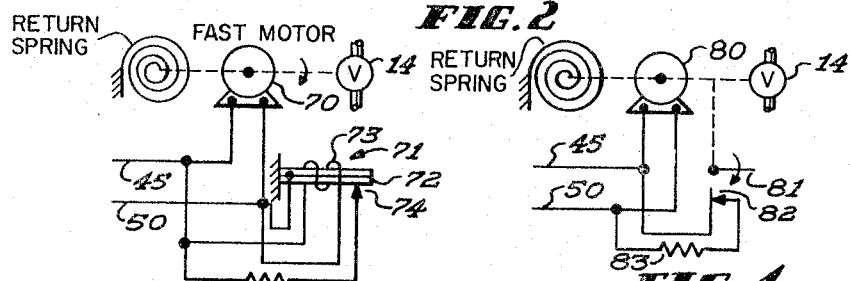
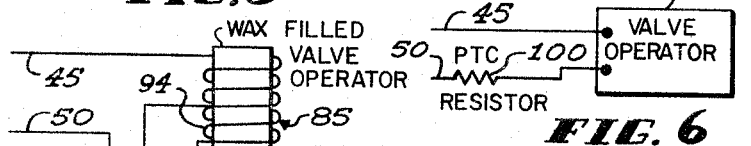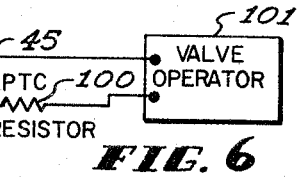
INVENTOR.
LORNE W. NELSON
BY Clyde C. Blinn
ATTORNEY

United States Patent Office 3,309,019
Patented Mar. 14, 1967

3,309,019
TEMPERATURE CONTROL SYSTEM WITH IMPROVED HEAT ANTICIPATION
Lorne W. Nelson, Bloomington, Minn., assignor to Honeywell Inc., Minneapolis, Minn., a corporation of Delaware
Filed Feb. 23, 1965, Ser. No. 434,220
15 Claims. (Cl. 236—68)

The present invention is concerned with a temperature control system having a thermostat for controlling a control device wherein the "heat anticipation" to the thermostat is varied as the load on the system increases; in particular, a means is provided for maintaining the "heat anticipation" to the thermostat at a high level for an initial predetermined period of each operating cycle and for a reduced level for the remaining period of each operating cycle.

In temperature control systems, the need of "heat anticipation" in a thermostat to provide a good control system has been recognized for many years. In such a system, a heater for artificially heating the temperature responsive portion of a space thermostat causes the thermostat to become satisfied before the temperature reaches the control point setting to anticipate the satisfaction of the thermostat to prematurely turn off the temperature conditioning apparatus and eliminate an overshooting of the temperature in the space. As the amount of heat anticipation is increased, the offset or "droop" of the control point of the thermostat increases. At light loads of a heating system, a large amount of droop brought about by a large amount of "heat anticipation" is necessary to provide good control and fast cycling of the heat supply means to eliminate swings in the temperature of the space. With such a large amount of anticipation, an increase in the load on the system will result in a substantial reduction in the temperature maintained in the space.

To prevent the excessive "droop" in the temperature of the space as the load increases, various means have been provided. The outdoor temperature which is indicative of the load on the system has been sensed and a means has been used to reset the control point of the thermostat to overcome the adverse "droop." In temperature control systems wherein the heat supplied to the space is furnished by a supply of hot water at a relatively high temperature, the need of heat anticipation in the thermostat becomes increasingly more important. At light loads when only a short period of operation of a valve in the supply line is needed, the water supplied to a radiator in the space can result in the supply of a large amount of heat. In order to prevent abnormal swings in the space temperature, such a system can be adequately controlled by having a large amount of "heat anticipation" in the space thermostat. At the same time, while the large amount of heat anticipation in the thermostat is not objectionable under light load conditions, as the load increases in the space the "droop" experienced with the large amount of anticipation results in an objectionable offset in the controlled temperature of the space.

The present invention provides for a means to reduce the amount of heat anticipation to the thermostat as the load increases so that even though the system is operating under light loads with a large amount of anticipation, as the load increases, the amount of anticipation to the thermostat is reduced and the "droop" in the space temperature is maintained within tolerable limits. Specifically, the present invention provides for a high level of "heat anticipation" for an initial period of each "on" cycle and a low level for the remaining period of each operation of the thermostat. By such an arrangement, at light loads the average heat anticipation to the thermostat during each operating cycle is quite high and even through with such high anticipation some droop exists, the droop of the space temperature below the control point setting is small and not objectionable. At the same time, the cycling rate at light loads is high to prevent the undesirable long off period and provide a more even heat output from the furnace. At the load on the system increases and the operating cycles become longer, the integrated amount of heat anticipation for each operating cycle is increased. Even though the integrated amount of heat anticipation increases the average heat anticipation for each operating cycle is less thus resulting in a maximum droop of control air temperature at 100% load which does not significantly exceed the droop of a thermostat with the nominal reduced level of heat anticipation.

FIGURE 1 of the drawing is a schematic representation of a typical heating system supplying hot water to a plurality of zones under the control of a zone valve which is controlled by a space thermostat.

FIGURE 2 is a graphical representation of the cycling heating current delivered to the thermostat of the system shown in FIGURE 1 at two different loads.

FIGURE 3 is another embodiment of the invention as shown in FIGURE 1 wherein a fast motor is used to control the hot water supply valve and the change in thermostat anticipation current is accomplished by a thermal delay switch means.

FIGURE 4 is another embodiment of the present invention wherein the switch on a motor used to control the zone valve is used to control the current to the thermostat.

FIGURE 5 is another embodiment of the present invention when applied to a wax filled thermal valve operator having a switch for controlling the heat anticipation current to the thermostat, and FIGURE 6 is another embodiment of the present invention making use of a positive temperature coefficient resistance in the thermostat circuit for varying the heat anticipation current to the thermostat as the load on the heating system increases.

FIGURE 7 is a graphical representation of offset or "droop" versus load.

Referring to FIGURE 1, a typical temperature control system is shown for a plurality of zones A and B. Heat is supplied to the space or to radiators 10 and 11 for a furnace or temperature conditioning means 12 by forcing a medium or water through supply pipes by a pump 13. The flow of water from furnace 12 to radiator 10 is controlled by a conventional control means or valve 14 in supply pipe 15 connected to the radiator. The water returns from radiator 10 back to the furnace through a return pipe 20. Water is supplied to radiator 11 by a similar valve 21 in the supply line 22. Radiator 11 has a return 23. The temperature of the water in the furnace 12 is maintained at a predetermined high value by controlling the flow of fuel with a fuel valve 24 which is energized by a temperature controller 25 responding to the furnace water temperature.

Each of the zones A and B have a similar control system and the control system zone A will be explained in some detail. The explanation of the system A can be used for the system of zone B. A zone thermostat 30 has a temperature responsive means or bimetal 31 which is positioned to close a switch 32 depending upon the temperature in the space. A conventional heat anticipation resistor 33 located in the thermostat artificially heats and modifies temperature responsive means 31 when switch 32 is closed to cause the thermostat to cycle at a cycling rate depending upon the load on the system.

Valve 14 is controlled by a heat motor operator or bimetal 34 which is heated by a heater 35. As the bimetal moves upward valve 14 is opened to increase the flow of hot water from furnace 12 to the radiator 10. The extreme end of bimetal 34 will engage a movable member or switch operator 40 to move the operator away from a fixed contact 41 and against a fixed contact 42. The switch formed by member 40 and contacts 41 and 42 might be a conventional SPDT snap action switch.

The energization of winding 35 is accomplished by connecting winding 35 to a source of power 43 comprising a transformer having a secondary winding 44 by a circuit traced as follows: from switch 32, a conductor 45, movable member 40, contact 41, winding 35, a conductor 50, secondary 44, a conductor 51, heater 33, and back to switch 32. Upon a call for heat by thermostat 30, switch 32 will close to energize heater 35 and the bimetal 34 will move upward to open valve 14. The thermal operator or bimetal 34 is of the type which is fast acting so that for a particular on time, such as one minute, of the thermostat 30 under a light load condition, the heat supplied to bimetal 34 by winding 35 is sufficient to completely open the valve and cause the switch formed by members 40 and contact 41 to open. When member 40 engages contact 42, a higher resistance path through a resistor 52 is provided to not only cut out the current in winding 35 but to reduce the amount of current in heater 33 of the thermostat. Since no heat to winding 35 exists to maintain the bimetal 34 heated, the bimetal will cool and cause the switch to operate to again place the winding 35 in the circuit. The rapid action of the switch to turn the heat on and off, provides a low level heat. By the use of resistor 52, the heat anticipation heat to thermostat 30 will be reduced for the remaining portion of the on cycle. As soon as thermostat 30 is satisfied, heater 35 will be de-energized and bimetal 34 will immediately cool to close valve 14 and to return the movable member 40 to the initial position as shown against contact 41. On the next cycle of the thermostat after the temperature of bimetal 31 has dropped to close switch 32, another on cycle will be provided and during the initial portion of the on cycle, the current to heater 33 will be at a high level. The reduction of current to heater 33 takes place after the thermostat has been closed a predetermined period of time which may be less than the normal on cycle of the thermostat even at a very light load. A similar operation will take place for the thermostat 60 in zone B which is used to control valve 21.

Referring to FIGURE 2, the graphical representation of the heat to the thermostat for an operating cycle is shown for both light loads and heavy loads. In the light load graphical representation, the "on" period of the thermostat is shown to have a high heater current for the thermostat for a predetermined part of the on cycle represented by the portion shown in the bracket labeled 61. After the predetermined "on" period, the current to the thermostat is reduced as indicated by the lower level 62. The "on" cycle at light loads is relatively short and the amount of heat to the thermostat is primarily due to the heat furnished by high current level 61. At light loads the average heater current for each "on" operation is high, but the integrated amount of heat anticipation for each operating cycle is low as the "on" cycles are short. As the load on the heating system increases and the "on" cycle of the thermostat becomes longer, the high heat level 61 as shown in the heavy load representation will remain; however, the heat furnished during the lower level of current to the thermostat as shown by that of the bracket 63 increases. The average heater current for each "on" period will decrease, but since the cycles are longer the integrated heat anticipation for each operating cycle is larger. As the length of the low level of current increases as the "on" cycles increase the integrated heat anticipation increases.

While the "droop" is large at a low load, the "droop" at maximum load will be substantially the same as a thermostat with a nominal size heater having low level 62 as the average heater current for an "on" cycle will approach the value of the low level as the cycles lengthen. As the load increases and the "on" cycle of the thermostat increases, the integrated heat to the thermostat will increase at a slower proportion and the droop of the system will increase in a similar manner.

In the system of FIGURE 1, wherein a fast operator 34 is used to open the valve 14, the operation of the switch for reducing the level of heat anticipation to the thermostat can be the switch controlled by the thermal operator. In the system shown in FIGURE 3 wherein a fast spring return motor 70 is used to control the valve 14, the motor may have an operating time which is so fast that if a switch were used on the motor to change the level of anticipation current to the thermostat after the motor had opened the valve 14, the time of high level heat for the "on" cycle of the thermostat would be too small. In order to lengthen this high level "on" period for each operating cycle, a thermal or time delay means 71 is provided. A bimetal 72 has a heater 73 which is connected in parallel with motor 70. When the switch 74 associated with bimetal 72 is opened, a resistance 75 which is normally connected in parallel with motor 70 is removed from the circuit to decrease the current to the thermostat which would be connected to the conductors 45 and 50.

Referring to FIGURE 4, a motor 80 of slower speed than used in FIGURE 3 is used to control the valve 14. As was the case with the operator 34 of FIGURE 1, a movable member 81 connected to motor 80 is used to control a switch 82. When motor 80 has driven valve 14 wide open, switch 82 is opened to remove the resistor 83 from the circuit to change the heat anticipation current to the thermostat.

In FIGURE 5, a wax filled valve operator 84 is shown for operating a valve 14. Upon the energization of a winding 85, when the thermostat closes, the wax in the operator is heated to expand to move the member 90 downward and open the valve. A conventional end switch is provided wherein a movable member 91 is moved away from a contact 92 to open a switch and against a contact 93 to close a switch. When member 91 moves against switch 93, an additional portion 94 of winding 85 is placed in the circuit and the heat to the wax filled operator is reduced. In addition, the current to the thermostat is reduced to provide the low level of anticipation.

In FIGURE 6, a positive temperature coefficient resistor 100 is connected in the circuit between the thermostat and the valve operator 101. As the current passes through resistor 100, the temperature of the resistor increases and the resistance in the circuit between conductors 45 and 50 increases to change the current in the thermostat and thus reduces the anticipation of the thermostat to a low level.

In FIGURE 7 the offset or "droop" of the controlled temperature is shown for different loads on the system. A nominal thermostat could have a characteristic as shown by curve 110. Such a nominal thermostat might have an average thermostat heater current represented by level 62 in FIGURE 2. If a high level of current such as 61 was selected, the droop curve might be as shown in FIGURE 7 by curve 111 to result in an unacceptable droop at high loads. The desired "droop" curve 112 is attained by the present invention.

*Operation*

The present invention makes use of a reduction in the level of heat anticipation to the thermostat so that the average heat anticipation to the thermostat decreases but the integrated heat anticipation increases with an increase in load. To provide such a changing anticipation, the initial anticipation current to the thermostat is maintained at a high level as shown by the bracketed portion 61 in FIGURE 2. The period of time in which this high level of anticipation current is maintained is generally shorter than the on cycle of a thermostat controlling the system. After the system has been operating for a predetermined time, the current to the thermostat is reduced to provide a low level of heat anticipation. The low level as shown by the portion 62 in FIGURE 2 at light loads is quite short as the on cycle of the thermostat is short. As the load on the heating system such as zone A of FIGURE 1 increases, the "on" time of the thermostat increases and a greater portion of the heat to the thermostat consists of the heat from the low level portion 63 as shown in FIGURE 2. The average heat per "on" period is shown to decrease but the integrated heat for one complete cycle increases. When the system was operating under light load conditions, the selection of the amount of "heat anticipation" in the thermostat as determined by the high level shown by 61 in FIGURE 2 could be made to provide a high amount of anticipation heat in the thermostat with the resulting fast cycle of the system. With a system such as that as shown in FIGURE 1 where hot water was supplied to a radiator 10, as well as other types of conditioning systems, a short "on" cycle is advantageous to prevent overshooting of the control point in the zone during light loads. As the load on the system increases and the "on" cycle of the thermostat increases, the temperature controlled by the thermostat 30 in zone A would tend to drop if the high droop was maintained; however by reducing the heat anticipation current to a lower level for the remaining portion of the longer cycles, as shown in the heavy load characteristic of FIGURE 2, the thermostat is gradually transformed to a lower droop characteristic.

If the average thermostat current remained at the high level 61, as shown in FIGURE 2, for the "on" cycle, the integrated heat anticipation for a complete cycle would become large as the load on the system approached 100%. With the large integrated "heat anticipation" at a large load the offset or "droop" would be unacceptably large as shown by curve 111 in FIGURE 7. At the light system loads, the high level of average heat anticipation produces mast cycling of the heat source which not only prevents "overshooting" of the selected temperature but it provides a more even heat supply from the furnace for added comfort. The objectionable long off periods of the heat source are not present.

The present invention maintains the advantages of control by a thermostat with a high amount of "heat anticipation" at low loads, and during the higher loads, the "droop" is maintained within acceptable limits. In fact, the higher the system load, the "heat anticipation" approaches a level of a nominal thermostat heater which would be represented by level 62 in FIGURE 2. As the "on" cycles become longer, the average "heat anticipation" approaches level 62; therefore the "droop" at the maximum system load is approximately the "droop" of a nominal thermostat as shown by curve 110 in FIGURE 7. The desired "droop" curve 112 has a rather flat portion 113 over a large range of percent loads which provides for a minimum change in the "droop" of the system through the load range which may be experienced in the course of a day.

The various embodiments of the persent invention provide for specific ways of accomplishing the high and low level of heat anticipation to the thermostat. Whenever the operation of the actuator for the valve such as the bimetal 34 for valve 14 in zone A of FIGURE 1 is such to open the valve in a predetermined short period of time such as one minute, the bimetal actuator itself can be used to operate this switch which would change the heat anticipation level from a high level to the low level. In cases when a faster motor is used such as that shown in FIGURE 3, the motor 70 would be used to control the valve and a thermal operator 71 would be used to control the change of heat anticipation level in the thermostat. By means of thermal operator 71, the resistance in the thermostat circuit would be changed after a predetermined period of time which in the apparatus of FIGURE 3 would be greater than the time required for the motor 70 to open the valve wide open.

In the embodiment of FIGURE 4, the motor 80 has an operating time which was substantially that needed for the length of time of the high heat anticipation level. In such a case as in the bimetal actuator of FIGURE 1, the motor 80 could control a movable member 81 to open switch 82 when the valve reached the wide open position. Switch 82 would reduce the current to the thermostat and start the low level of anticipation current.

In the embodiment of FIGURE 5, the wax filled valve operator having a time of operation susbtantially the same as that required for the high level of heat anticipation as shown in FIGURE 2, could be used to control the switch formed by the movable member 91 and contact 93 to reduce the anticipation level to the thermostat by increasing the amount of winding in the circuit. The average heat maintained as the switch 91–93 cycles is the low level shown as 62 in FIGURE 2.

In the embodiment of FIGURE 6, the time constant of the positive temperature coefficient resistor 100 would have to be such that the increase in resistance of resistor 100 took place in a time period substantially the length of the time shown by the high heater current 61 in FIGURE 2. At the end of an operating cycle, the temperature of resistor 100 would drop to the nonenergizing level so that upon the commencement of another on cycle, the current to the thermostat would be high to provide the initial high level of heat anticipation. While the positive tempertaure coefficient resistor is shown in the circuit which would be connected to the thermostat by connecting conductors 45 and 50 in the circuit as shown in FIGURE 1, the positive temperature coefficient could be in another part of the circuit or might be used as the heat anticipation heater in the thermostat. In any case, the time required for the resistor to change resistance to cut down the heat anticipation current to the thermostat from the high to the low level would have to be relatively shorter than the on cycle of the thermostat under light loading conditions.

While the present invention has been described as applied to various embodiments used in a system, the intent is only to limit the scope of the invention by the scope of the appended claims in which I claim:

1. In a temperature control system having a thermostat wherein the "heat anticipation" decreases as the load on the system increases, temperature responsive switch means responsive to the temperature of a space, heating means for said temperature responsive switch means, a source of temperature conditioned medium, control means, connection means including said control means for connecting said source to supply conditioned medium to said space, a source of power, circuit means including said switch means for connecting said control means and said heating means to said source of power to provide a first predetermined heat level of said heating means, and means operated after a predetermined period of energization of said control means on each cycle of operation for decreasing said heat to said heating means to a lower predetermined level whereby the average heat supplied to said temperature responsive switch means is decreased as the load on said source of conditioned medium increases.

2. In a temperature control system with means for decreasing the "heat anticipation" of the system as the load on the system increases, space temperature responsive means, control means for controlling the flow of temperature conditioned medium to the space, means connecting said responsive means to said control means, first means for artificially satisfying said temperature responsive means, means for energizing said first means at a high level for a predetermined period each time said responsive means operates said control means, said predetermined period of time being in the order of magnitude of an "on" cycle of said responsive means at the lowest operating conditioning load, and second means for energizing said first means at a low level after said predetermined period for the remaining "on" cycle whereby as the load on the system increases and said "on" cycle becomes longer said temperature responsive means is artificially heated by a decreasing amount.

3. In a space temperature control system, a thermostat, heater means for artificially heating said thermostat for "heat anticipation" purposes, a control device for controlling the flow of heat to the space, a source of power, first circuit means including said thermostat for connecting said source to said control device to provide an "on" operation and for connecting said heating means to said source to artificially heat said thermostat at a first level during the initial part of each "on" operation of said control device for a predetermined period, said predetermined period being equal to the "on" operation at a low load, and further means for reducing the effect of said heating means after said predetermined period for the remaining period of said "on" operation.

4. In a control system, a space thermostat, temperature conditioned medium supply means for delivering a supply of temperature conditioned medium to a space, means connecting said thermostat to control said supply means, first means to artificially modify said thermostat, means for energizing said first means by said thermostat during a portion of an operating cycle whereby said thermostat is allowed to cycle to provide intermittent "on" operations during which medium is supplied to said space, means for energizing said first means at a first high level for an initial period of each of said portion and at a low level for a remaining period of each of said portion.

5. In a method of controlling a temperature control system to reduce the "heat anticipation" of the system as the temperature conditioning load increases, artificially heating a system thermostat at a high level for a predetermined portion at the beginning of each operation cycle of a temperature conditioning apparatus, and artificially heating the thermostat at a reduced level for a remaining portion of each cycle.

6. In a method of controlling a temperature control system to change the "heat anticipation" to a thermostat as the load on the system increases, modifying the control temperature of the thermostat by a high degree upon each operation cycle of the system, and after each operation cycle has existed for a predetermined time modifying the control temperature of the thermostat by a lower degree.

7. In a space temperature control system having a source of hot water to be supplied to at least one space heat exchanger, space temperature responsive means, a source of power, control valve means for controlling the flow of hot water to the space, delayed action switch means, heating means thermally connected to said space temperature responsive means, circuit means including said space temperature responsive means and said heating means for connecting said control valve means and said switch means to said source whereby upon said responsive means calling for heat, said heating means and said control valve means are energized to artifically heat said responsive means and deliver hot water to the space, respectively, means connecting said switch means to said circuit means to reduce the current to said heating means after a first portion of each "on" period, said heating means being energized at a first level for said first portion of each "on" period of said control valve means, said first portion being shorter than an "on" period at a minimum load.

8. In a temperature control system, a temperature responsive means responsive to a space temperature, temperature conditioning means for supplying heated medium to said space, a heat anticipation heater means thermally associated with said temperature responsive means, a source of power, control means for controlling the supply of heated medium to said space, circuit means including said temperature responsive means for connecting said source of power to said heating means and said control means, and circuit means connected to said heating means for changing the level of energization of said heater means after a predetermined period of operation of said heater means to reduce the amount of heat anticipation of said temperature responsive means.

9. An improvement to a temperature control system having a thermostat for controlling the operation of temperature conditioning means to supply conditioned medium to a space, the thermostat having a heat anticipation heater, the improvement comprising means for maintaining the anticipation heat to the thermostat at a high level for a first period of each on operation of the conditioning means and at a reduced level for a remaining period of each on operation of the conditioning means.

10. In a temperature control system, a thermostat responsive to space temperature, a source of hot water for heating the space, valve means for controlling the flow of hot water to said space, a fast operating motor means for controlling said valve means, circuit means connecting said thermostat to said motor means to open said valve means upon the need of hot water to the space, heating means for artifically heating said thermostat at a high level each time said thermostat energizes said motor means, a delay operation switch means having a predetermined delay time longer than the time required to open said valve means, said delay time being shorter than a minimum "on" operation period of said thermostat, means connecting said delay means to be energized each time said thermostat energizes said motor means, circuit means including said delay switch means for modifying the effect of said heating means after said predetermined time to reduce the level of artificial heating of said thermostat on each "on" operation for a remaining "on" operation period.

11. In a temperature control system, a space thermostat, a source of temperature conditioned medium, control means for controlling the flow of medium to said space, said control means having a thermal operator, a heater, first circuit means connected to said thermal operator to limit the heat level of said operator, heating means associated with said thermostat for "heat anticipation," a source of power, means including said thermostat and said first circuit means connecting said heating means and said heater to said source whereby upon a call for conditioned medium said thermostat is artificially heated, and means including said first circuit means for changing the level of energization of said heating means when said thermal operator has energized said control means.

12. In a temperature control system, a thermostat, a source of power, control means, a heater thermally associated with said thermostat, temperature responsive impedance, circuit means including said thermostat, said impedance and said heater for connecting said control means to said source, said heater being energized at a first level at the beginning of each "on" cycle of said control device and upon said impedance changing in value as current passing through the impedance increases its temperature, said heater is energized at a second level for a remaining portion of said "on" cycle.

13. In a temperature control system, a thermostat with an anticipation heater means to provide a cycling operation, a source of heated medium, motor operated means, a source of power, means including said thermostat for connecting said motor operated means to said source to control the flow of heated medium to the space, said motor operated means having an operating time less than an "on" operation of a thermostat cycle at a low load, and means associated with said motor operated means to decrease the current to said heater means on each cycle when said motor operated means is operated.

14. An improvement in the temperature control system having a thermostat for controlling the operation of a temperature conditioning means to supply temperature conditioned medium into a space, the thermostat having a "heat anticipation" heating means which is energized each time the thermostat calls for operation of said conditioning means, the improvement comprising means for maintaining the "heat anticipation" to the thermostat at a high level for a first period of each "on" operation of the conditioning means and at a reduced level for a remaining portion of each period of "on operation" of the conditioning means whereby the temperature conditioning means is cycled with frequent short cycles at low conditioning loads to maintain an even output from the temperature conditioning means and as the conditioning load increases the operation of the thermostat approaches that of a nominal thermostat having a heat anticipation of said reduced level.

15. In a method of controlling a temperature control system to reduce the "heat anticipation" of the system as the temperature conditioning load increases to provide a system having a high "droop" characteristic at low loads and as the load on the temperature conditioning system increases a nominal "droop" characteristic exists, artificially adjusting the control point of the system thermostat at a high level at the beginning of each operating cycle of the conditioning apparatus, and artificially adjusting the control point of the thermostat at a different level for the remaining portion of each cycle.

References Cited by the Examiner
UNITED STATES PATENTS

| | | | |
|---|---|---|---|
| 1,564,804 | 12/1925 | Warren | 236—68 |
| 1,856,586 | 5/1932 | Persons | 236—68 X |
| 2,059,362 | 11/1936 | Kimball | 236—68 |
| 2,156,082 | 4/1939 | Crago | 236—68 |
| 2,249,215 | 7/1941 | Lange | 236—68 |

ROBERT A. O'LEARY, *Primary Examiner.*

ALDEN D. STEWART, *Examiner.*